United States Patent
Eaton et al.

(10) Patent No.: US 6,701,221 B1
(45) Date of Patent: Mar. 2, 2004

(54) METHOD AND APPARATUS FOR PREVENTING EXCESSIVE HEAT GENERATION IN A ALTERNATOR OF A GENERATOR SET

(75) Inventors: Zane C. Eaton, Plymouth, WI (US); Vikram Kaura, Minneapolis, MN (US); Richard D. Van Maaren, Sheboygan, WI (US); Douglas W. Dorn, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 378 days.

(21) Appl. No.: 09/695,166

(22) Filed: Oct. 24, 2000

(51) Int. Cl.⁷ ............................................. G05D 11/00
(52) U.S. Cl. ..................... 700/286; 700/22; 700/293; 290/40; 361/31; 361/68
(58) Field of Search .................... 700/236, 293, 700/287, 292, 290; 361/319, 68, 31; 290/40

(56) References Cited

U.S. PATENT DOCUMENTS

| | | |
|---|---|---|
| 3,654,484 A | 4/1972 | Jorgenson et al. |
| 3,715,652 A | 2/1973 | Elliston |
| 4,128,771 A | 12/1978 | Domenico |
| 4,208,693 A | 6/1980 | Dickens et al. |
| 4,219,860 A | 8/1980 | DePuy |
| 4,245,182 A | 1/1981 | Aotsu et al. |
| 4,280,060 A | 7/1981 | Kure-Jensen et al. |
| 4,322,630 A | 3/1982 | Mezera et al. |
| 4,326,159 A | 4/1982 | Aotsu et al. |
| 4,330,743 A | 5/1982 | Glennon |
| 4,345,288 A | 8/1982 | Kampf et al. |
| 4,346,337 A | 8/1982 | Watrous |
| 4,368,520 A | 1/1983 | Hwang et al. |
| 4,403,292 A | 9/1983 | Ejzak et al. |
| 4,403,293 A | 9/1983 | Bradt et al. |
| 4,438,385 A | 3/1984 | Sato et al. |

(List continued on next page.)

FOREIGN PATENT DOCUMENTS

| | | |
|---|---|---|
| GB | 2 055 262 A | 7/1980 |
| JP | 60-16195 | 1/1985 |

OTHER PUBLICATIONS

Protective Relaying Principles and Applications, 2d ed., J. Lewis Blackburn, pp. 248–249, 312–315, and 370–371, 1998.
BE1–50/51B Time Overcurrent Relay, Basler Electric, 5 pages, 6–92 and 7–96.
Generator Protection, Ch. 11, ANSI/IEEE Std 242–1986, pp. 441–451 and 470–471.
Kohler Power Systems literature: form G12–197, 6/96; from G6–34, 2/97; form G11–63, 10/95; form G11–56, 6/94; form G6–35, 3/98; and form TIB–102, 11/97.

(List continued on next page.)

Primary Examiner—Leo Picard
Assistant Examiner—Kidest Bahta
(74) Attorney, Agent, or Firm—Quarles & Brady LLP

(57) ABSTRACT

A method and apparatus are disclosed for preventing damage to an alternator of a genset resulting from high currents within the alternator. The method includes calculating, at a processor, a first quantity related to a current flowing through the alternator during a first time period, and comparing, at the processor, the first quantity with a first threshold. The method further includes calculating, at the processor, a second quantity related to the current flowing through the alternator during at least one of the first time period and a second time period, and comparing, at the processor, the second quantity with a second threshold. The method additionally includes indicating a current overload condition if at least one of the first quantity exceeds the first threshold or the second quantity exceeds the second threshold.

19 Claims, 6 Drawing Sheets

U.S. PATENT DOCUMENTS

| | | |
|---|---|---|
| 4,438,498 A | 3/1984 | Sekel et al. |
| 4,443,828 A | 4/1984 | Legrand et al. |
| 4,477,765 A | 10/1984 | Glennon et al. |
| 4,481,459 A | 11/1984 | Mehl et al. |
| 4,486,801 A | 12/1984 | Jackovich et al. |
| 4,498,016 A | 2/1985 | Earleson et al. |
| 4,527,071 A | 7/1985 | Ausiello |
| 4,533,863 A | 8/1985 | Luhn et al. |
| 4,538,231 A | 8/1985 | Abe et al. |
| 4,550,379 A | 10/1985 | Kawai et al. |
| 4,559,487 A | 12/1985 | Sims et al. |
| 4,583,036 A | 4/1986 | Morishita et al. |
| 4,589,052 A | 5/1986 | Dougherty |
| 4,593,348 A | 6/1986 | Tewesmeier |
| 4,598,373 A | 7/1986 | Morishita et al. |
| 4,602,341 A | 7/1986 | Gordon et al. |
| 4,617,626 A | 10/1986 | Morishita et al. |
| 4,651,081 A | 3/1987 | Nishimura et al. |
| 4,659,977 A | 4/1987 | Kissel et al. |
| 4,670,704 A | 6/1987 | Maehara et al. |
| 4,672,501 A | 6/1987 | Bilac et al. |
| 4,682,097 A | 7/1987 | Matsui |
| 4,701,690 A | 10/1987 | Fernandez et al. |
| 4,714,869 A | 12/1987 | Onitsuka |
| 4,731,547 A | 3/1988 | Alenduff et al. |
| 4,777,425 A | 10/1988 | MacFarlane |
| 4,800,291 A | 1/1989 | Bowers |
| 4,839,575 A | 6/1989 | MacFarlane |
| 4,855,664 A | 8/1989 | Lane |
| 4,912,382 A | 3/1990 | Koenig et al. |
| 4,937,561 A | 6/1990 | Sasaki et al. |
| 4,996,646 A | 2/1991 | Farrington |
| 5,006,781 A | 4/1991 | Schultz et al. |
| 5,057,962 A | 10/1991 | Alley et al. |
| 5,117,174 A | 5/1992 | Kessler |
| 5,168,208 A | 12/1992 | Schultz et al. |
| 5,206,776 A | 4/1993 | Bodenheimer et al. |
| 5,216,350 A | 6/1993 | Judge et al. |
| 5,294,879 A | 3/1994 | Freeman et al. |
| 5,298,842 A | 3/1994 | Vanek et al. |
| 5,303,160 A | 4/1994 | Winter et al. |
| 5,305,234 A | 4/1994 | Markus et al. |
| 5,309,312 A | 5/1994 | Wilkerson et al. |
| 5,376,877 A | 12/1994 | Kern et al. |
| 5,390,068 A | 2/1995 | Schultz et al. |
| 5,418,675 A | 5/1995 | Bodenheimer et al. |
| 5,450,268 A | 9/1995 | Phillips et al. |
| 5,451,876 A | 9/1995 | Sandford et al. |
| 5,477,827 A | 12/1995 | Weisman, II et al. |
| 5,483,927 A | 1/1996 | Letang et al. |
| 5,486,751 A | 1/1996 | Koenig |
| 5,504,417 A | 4/1996 | Kern et al. |
| 5,615,654 A | 4/1997 | Weisman, II et al. |
| 5,640,060 A | 6/1997 | Dickson |
| 5,701,070 A | 12/1997 | Schultz |
| 5,732,676 A | 3/1998 | Weisman et al. |
| 5,751,532 A | 5/1998 | Kanuchok et al. |
| 5,754,033 A | 5/1998 | Thomson |
| 5,761,073 A | 6/1998 | Dickson |
| 5,847,644 A | 12/1998 | Weisman, II et al. |
| 5,886,504 A | 3/1999 | Scott et al. |
| 5,938,716 A | 8/1999 | Shutty et al. |
| 5,978,729 A | 11/1999 | Landes et al. |
| 5,994,794 A * | 11/1999 | Wehrlen ..................... 307/66 |
| 5,999,876 A | 12/1999 | Irons et al. |
| 6,011,480 A * | 1/2000 | Schweitzer et al. ......... 340/644 |
| 6,018,200 A | 1/2000 | Anderson et al. |

OTHER PUBLICATIONS

System Coordination With Fast–Response Generators, Gordon S. Johnson, Kohler Co., Generator Division, 1983.

A Working Manual on Molded Case Circuit Breakers, 4$^{th}$ ed., Westinghouse, pp. 162, 16, and 41–43, 3/93.

Literature concerning Automatic Engine Controllers by DynaGen Systems, Inc., found at http://dynagensystems.com, printed Mar. 1, 2000.

Literature concerning Diesel and Gas Generator Set, found at http://www2.savoiapower.com, printed Mar. 2, 2000.

Literature concerning alternators, found at http://www.wai-–wetherill.com, printed Mar. 2, 2000.

Literature concerning electric motors, found at http://www-.friesen.com, printed Mar. 2, 2000.

Regulation en temps réel d'une génératice asynchrone, Electronique Industrielle, pp. 70–73, avril, No. 86, Paris, France, 1985.

Digital Controller Design Method for Synchronous Generator.

Excitation and Stabilizer Systems; Part II: Hardware/Software.

Design and Implementation Results, IEEE Transactions on Power Systems, pp. 638–644, vol. PWRS–2, No. 3, Aug. 1987.

EE Handbook, 11th Edition, Fink & Beaty, pp. 18–27 through 18–39.

* cited by examiner

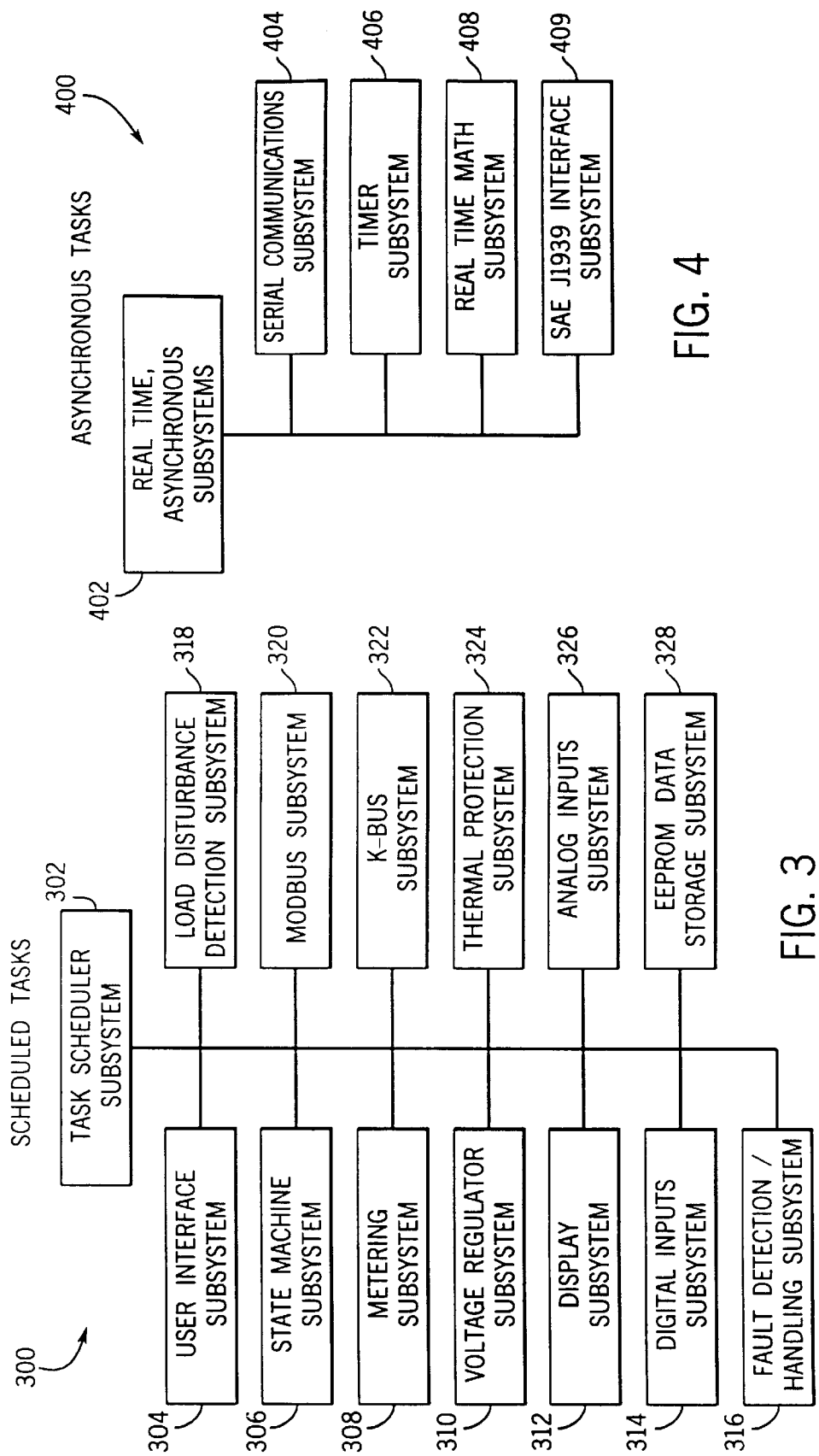

Volts (low wye/high wye)

|  | 173/346 | 190/380 | 200/400 | 208/416 | 220/440 | 230/460 | 240/280 |
|---|---|---|---|---|---|---|---|
| 50 Hz | 225 | 245 | 235 | 215 | 160 | ✕ | ✕ |
| 60 Hz | ✕ | ✕ | 220 | 240 | 270 | 300 | 350 |

Frequency (row labels at left)

Maximum Power (KW) Values

Fig. 7

METHOD AND APPARATUS FOR PREVENTING EXCESSIVE HEAT GENERATION IN A ALTERNATOR OF A GENERATOR SET

FIELD OF THE INVENTION

The present invention relates to the control of an electric generator set including an engine and an alternator. In particular, the present invention relates to the control of an electric generator set to prevent the generation of excessive heat by the alternator.

BACKGROUND OF THE INVENTION

Electric generator sets (or "gensets") are widely used to provide electric power. A genset typically includes an engine coupled to an alternator, which converts the rotational energy from the engine into electrical energy. The terminal voltage of a genset is proportional to both the magnetic flux density within the alternator, and the speed of the engine. The magnetic flux density is typically determined by controlling an armature voltage or field current on the alternator, while the speed of the engine is typically determined by an engine governor.

During the operation of the genset, excessively high levels of current can be produced within the alternator depending upon the load, the engine speed, and other factors. Such excessively high levels of current can produce excessive heat within the alternator, which can damage the alternator and produce other undesirable effects. Consequently, it is known to include a mechanism with a genset that stops or otherwise limits the operation of the genset if excessively high levels of current occur.

Typically, an alternator does not suffer damage or other undesirable effects from excessive heat unless it is exposed to the heat for an extended period of time. Consequently, excessively high currents within the wire windings of an alternator do not immediately cause damage to the alternator. Rather, exposure to excessively high currents over an extended period of time is the cause of damage to an alternator. It is known to determine whether excessive exposure is occurring in an alternator by (a) measuring the RMS current I within the alternator during a given time period, (b) taking the square of these current measurements to obtain $I^2$ during the time period, (c) calculating an integral or summation of $I^2$ over the time period to obtain a value $I^2t$, (d) comparing the result of the integral or summation with a damage curve specifying the maximum allowable value for $I^2t$ during the time period, and then (e) repeating this process during successive time periods.

While it is exposure to excessively high currents over an extended period of time that precipitates damage in an alternator, the levels of the currents to which the alternator can be exposed without sustaining damage vary significantly depending upon the amount of time the alternator is exposed to those currents. In particular, an alternator can be exposed to currents that are very high in magnitude when those currents are short-term transient currents, but can only be exposed to currents that are much lower in magnitude when the alternator is exposed to those currents over a long period of time.

Because the tolerance of an alternator with respect to excessive currents varies depending upon the time the alternator is exposed to those currents, the above-discussed process is not always an accurate indicator of whether the alternator is experiencing exposure to excessive currents. On the one hand, the above process may fail to indicate that the alternator is experiencing excessive exposure to a short burst of extremely high current because the average current level during the measured period of time is such that the overall value of $I^2t$ is less than the maximum tolerance specified by the damage curve for that period of time.

On the other hand, the above process may incorrectly indicate that the alternator is experiencing excessive exposure when there is a short burst of extremely high current such that the overall value of $I^2t$ exceeds the damage curve even though, over the long term, the current levels are actually tolerable. This may be the case where, for example, the current immediately decreases to a very low level following the short burst of high current. This is particularly problematic if the damage curve is conservative, namely, the allowed values of $I^2t$ are set low. The damage curve may be set conservatively in order to avoid the problems discussed above, i.e., to minimize the inappropriate tolerance of short bursts of high current.

It would therefore be advantageous if a method and apparatus were developed for determining whether an alternator was being exposed to excessive currents and resultant heat, where the method and apparatus accounted for whether the currents were occurring for long periods of time or only for short periods of time. In particular, it would be advantageous if a method and apparatus were developed for determining excessive exposure of an alternator to currents during a given period of time in spite of the existence of significant short term variations of the currents within that period of time. It would additionally be advantageous if the method and apparatus were configured to cause a cessation or reduction in the operation of the genset upon a determination of the existence of excessive currents.

SUMMARY OF THE INVENTION

The present invention relates to a method of preventing damage to an alternator of a genset resulting from high currents within the alternator. The method includes calculating, at a processor, a first quantity related to a current flowing through the alternator during a first time period, and comparing, at the processor, the first quantity with a first threshold. The method further includes calculating, at the processor, a second quantity related to the current flowing through the alternator during at least one of the first time period and a second time period, and comparing, at the processor, the second quantity with a second threshold. The method additionally includes indicating a current overload condition if at least one of the first quantity exceeds the first threshold or the second quantity exceeds the second threshold.

The present inventors have discovered that it is possible to accurately determine whether an alternator is being exposed to excessive currents and resultant heat over a given period of time in spite of the existence of significant short term variations of the current by determining values of $I^2t$ (or related to $I^2t$) over both short periods of time and over long or unending periods of time, and then comparing the determined values with respect to both a short term limit and a long term limit, respectively. With respect to determining the value of $I^2t$ over the long term, it is necessary to increase the overall calculated value of $I^2t$ to account for periods of time in which the current I is greater than a rated current, and to decrease the overall calculated value of $I^2t$ to account for periods of time in which the current I is less than the rated current.

The present invention additionally relates to a method of preventing damage to an alternator of a genset resulting from high currents within the alternator. The method includes (a) calculating a first quantity equaling a first sum of n squares of n type-A normalized currents determined based upon n most recent current measurements obtained during n most recent successive short time periods; (b) determining whether the first quantity exceeds a first threshold; and (c) providing a first command to limit an operation of the genset when it is determined that the first quantity exceeds the first threshold. The method further includes (d) calculating a second quantity equaling a second sum of x values functionally dependent upon x squares of x type-B normalized currents determined based upon x current measurements obtained during x successive short time periods, wherein x is the total number of short time periods that have occurred since at least one of a first time at which a performance of the method began and a second time occurring after the first time. The method additionally includes (e) determining whether the second quantity exceeds a second threshold; and (f) providing a second command to limit an operation of the genset when it is determined that the second quantity exceeds the second threshold.

The present invention further relates to an apparatus for preventing damage to an alternator of a genset resulting from high currents within the alternator. The apparatus includes a means for measuring a current flowing within the alternator during successive time periods, and a processor coupled to the means for measuring. The processor is operable to calculate a first parameter that is related to a first set of measured current values that were obtained by the means for measuring during a first time period, and to calculate a second parameter that is related to a second set of measured current values that were obtained by the means for measuring during a second time period. The processor is further operable to compare the first parameter with a first threshold and the second parameter with a second threshold, and to provide a command to cause at least a portion of the genset to be limited in its operation when either the first parameter exceeds the first threshold or the second parameter exceeds the second threshold. The apparatus further includes a means responsive to the command to alter the operation of the genset.

The present invention additionally relates to an apparatus for preventing damage to an alternator of a genset resulting from high currents within the alternator. The apparatus includes a means for determining whether a current flowing through the alternator during a recent time period has been excessive; and a means for determining whether a current flowing through the alternator during an extended time period has been excessive. The apparatus further includes a means for halting the operation of the genset if at least one of the two determining means determines that the current has been excessive.

BRIEF DESCRIPTION OF THE DRAWINGS

FIG. 3 is a detailed block diagram of synchronous software tasks that are performable by the apparatus of FIG. 1;

FIG. 4 is a detailed block diagram of asynchronous software tasks that are performable by the apparatus of FIG. 1;

FIG. 7 is an exemplary voltage/frequency table for use in connection with the performance of the steps of FIG. 6.

DETAILED DESCRIPTION OF THE PREFERRED EMBODIMENT

Figure 1:
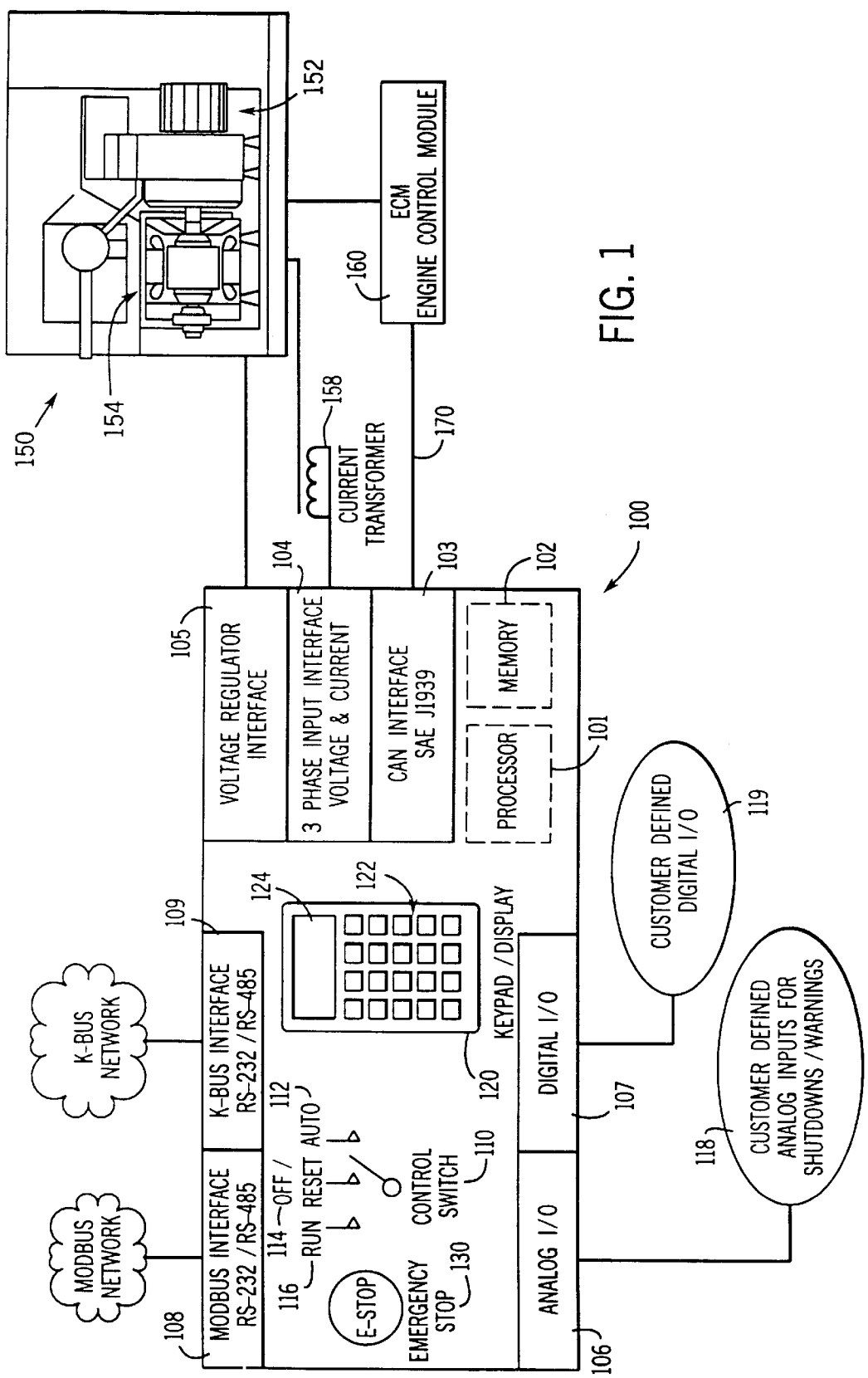
FIG. 1 is a block diagram showing a genset including an alternator, an engine control module, and an exemplary apparatus that is capable of determining whether the alternator is being exposed to excessive current and resultant heat.

Referring to FIG. 1, a generator set controller (or genset controller) 100 is shown coupled to a generator set (genset) 150. Genset controller 100 can be located remotely from genset 150 (up to 40 feet) or attached to the genset directly by way of an engine harness. Genset 150 includes an engine 152 and an alternator (or synchronous generator) 154, and has a typical power rating of between 20 kW and 2000 kW or more. Engine 152 is typically an internal combustion engine that is powered by gasoline, diesel fuel, methane gas or other fuels, for example, the Series 60, Series 2000 or Series 4000 engines manufactured by Detroit Diesel Company of Detroit, Mich. Engine 152 rotates a rotor (not shown) of alternator 154, which outputs electrical power. Alternator 154 is typically a three-phase machine, such as the Model 5M4027 alternator manufactured by Marathon Electric Company.

Figure 2:
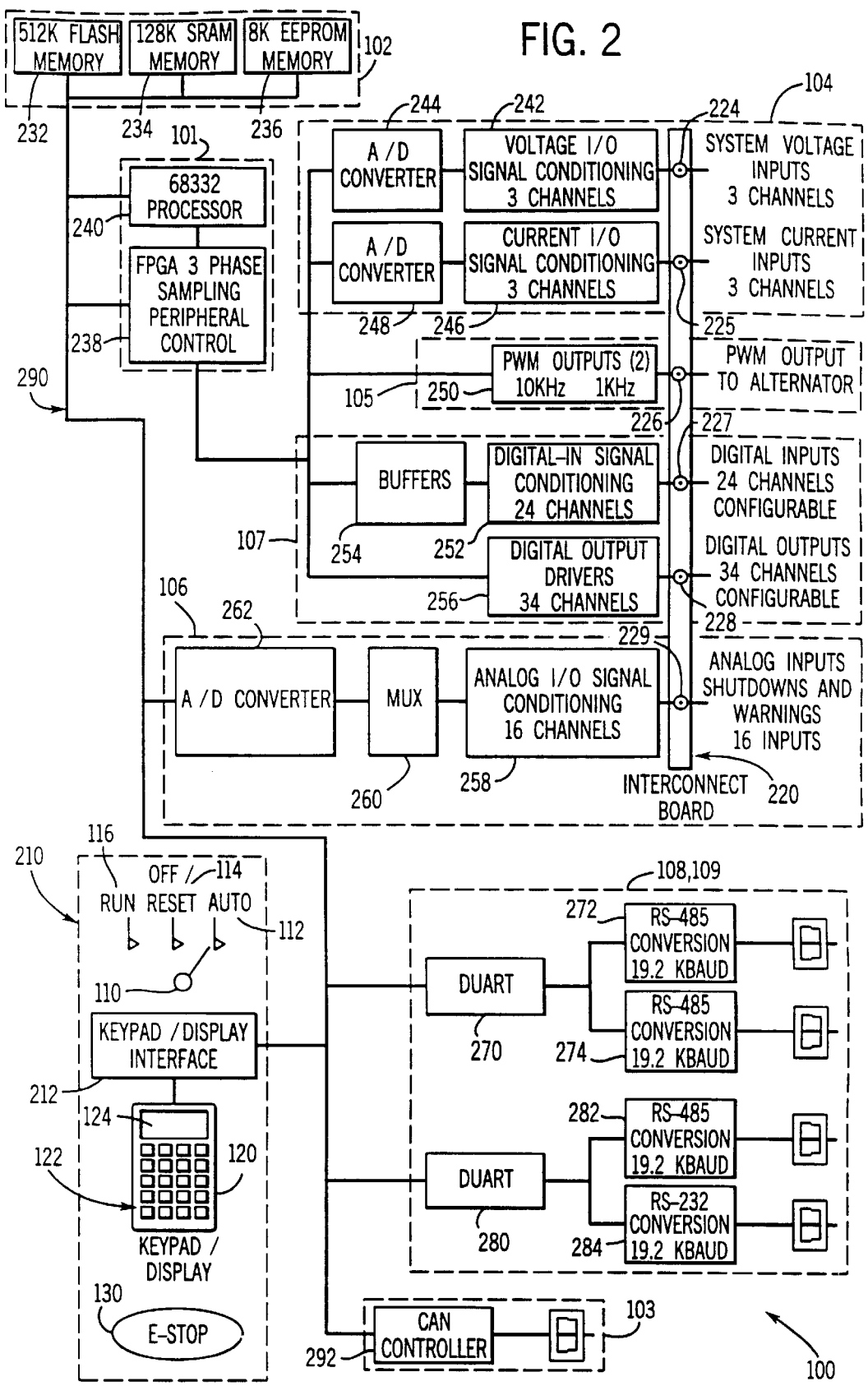
FIG. 2 is a detailed block diagram of the apparatus of FIG. 1.

Genset controller 100 operates to control and monitor the operation of genset 150. As shown in FIGS. 1 and 2, genset controller 100 is a microprocessor-based (or otherwise computer-driven) system having a processor 101 and a memory 102. Referring to FIG. 2, memory 102 includes a 512K FLASH memory 232, a 128K SRAM memory 234, and an 8K EEPROM memory 236. Processor 101 includes a microcontroller or microprocessor 240 (e.g., a MC68332 processor manufactured by Motorola, Inc. of Schaumburg, Ill.), and also a field-programmable gate array (FPGA) 238. FPGA 238 allows for memory allocation among memories 232–236. Processor 101 and memory 102 are coupled to one another and other elements of the genset controller 100 by an internal bus structure 290.

Genset controller 100 employs several interfaces to provide control and monitoring of genset 150, including a CAN interface 103, a three-phase input interface 104, a voltage regulator interface 105, an analog input/output interface (analog I/O) 106 and a digital input/output interface (digital I/O) 107. Three-phase input interface 104, voltage regulator interface 105 and digital I/O 107 each are coupled directly to FPGA 238 of processor 101, which allows for signal sampling, signal multiplexing, and control of peripheral devices (such as operator interface devices, discussed below). CAN interface 103 and analog I/O 106 are coupled to processor 101 by way of internal bus 290. Input and output ports for each of interfaces 104–107 are provided on an interconnect board 220 of genset controller 100.

The processor 240 operates under the direction of stored program instructions to read in information through the three-phase input interface 104 regarding the operation of the alternator 154 in the genset 150. Referring to FIGS. 1 and 2, the three-phase alternator output voltages are applied to system voltage inputs 224, and the three-phase alternator output currents are coupled through a current transformer 158 to system current inputs 225. These six analog input signals are filtered by respective voltage and current conditioning circuits 242 and 246 and are digitized by respective voltage and current analog-to-digital converters 244 and 248. These digitized indications of alternator output voltages and currents are read by the processor 240 and used to monitor genset performance. This information may be displayed and it may be used to calculate other genset operating parameters, such as output power, reactive power, power factor and alternator duty level and frequency.

The digitized alternator output signals are also used as the basis for controlling the operation of the alternator 154. As will be described below, the processor 101 is programmed to provide command signals to the voltage regulator interface 105. These commands operate a pulse width modulation (PWM) unit 250 which outputs pulse-width modulated signals to PWM output 226 of interconnect board 220. These PWM signals are applied to alternator 154 to control the voltage, current, and power output levels of the alternator. In particular, voltage regulator interface 105 provides an approximately 10 KHz PWM signal to adjust the field current on alternator 154 to control the armature voltage and maintain the output voltage at a particular level. The voltage regulator interface 105 may also provide a 1 KHz PWM signal for governing engine speed 152, if an ECM is not employed.

In addition to providing control and monitoring of alternator 154, genset controller 100 also provides control and monitoring of engine 152. Although in certain embodiments genset controller 100 directly controls engine 152, in the preferred embodiment genset controller 100 does not directly control the engine. Rather, the operation of engine 152 is directly controlled by an engine control module (ECM) 160, which typically is physically attached to the engine. ECM 160 can control engine speed (and other engine operating parameters), and thereby control the output power of alternator 154. ECM 160 also monitors a variety of engine characteristics, for example, fuel consumption, oil pressure, emissions levels, coolant temperature, time delay engine cool down information, and time delay engine start information.

The genset controller 100 controls and monitors the ECM 160 through CAN interface 103 which connects to the CAN serial link 170. CAN serial link 170, employs the SAE J1939 protocol which is an industry standard protocol for serial communications. By way of CAN databus 170, genset controller 100 receives the information about the operation of engine 152 that has been collected by ECM 160, and provides commands to the ECM 160 to influence the operation of the engine. Further, upon determining the occurrence of system faults, genset controller 100 provides commands to engine 152 via ECM 160 causing the engine to shutdown, by turning off both the ignition and the cranking of the engine. In particular, genset controller 100 can provide a command to slow down or entirely shut down the engine 152 if it is determined that one or more currents flowing through alternator 154 are excessive and may potentially produce excessive heat in the alternator.

The genset controller 100 includes analog I/O 106 and digital I/O 107 which enable it to communicate with a variety of devices. The analog I/O 106 receives up to sixteen separate analog input signals at inputs 229 on interconnect board 220. These analog signals are filtered by conditioning circuit 258, and applied to an A/D converter 262 through a multiplexer 260. The processor 101 can thus sequentially scan the analog inputs and read in digitized signals indicative of engine parameters such as engine temperature, gas emissions and engine battery charge.

The digital I/O 107 receives 24 single-bit TTL signals at digital inputs 227, and produces 34 single-bit TTL signals at digital outputs 228 on interconnect board 220. Digital inputs 227 are coupled to a digital input signal conditioning unit 252, which conditions the input signals and provides the signals to FPGA 238 via buffers 254. Three of the inputs 227 are dedicated to signals relating to emergency stopping, remote starting, and low coolant level of genset 150. The remaining inputs are definable inputs, which can be enabled or disabled, and are coupled to a variety of discrete sensors. The discrete sensors are capable of indicating various types of engine characteristics, warning conditions, and system faults relating to low fuel, or high oil temperature, as well as switchgear conditions concerning the synchronization of the power output of genset 150 with power lines to which the genset is being connected.

Genset controller 100 is capable of performing a variety of functions in response to the signals received at analog inputs 229 and digital inputs 227. In particular, genset controller 100 is capable of scaling the signals, monitoring genset parameters through the use of the signals, detecting system faults, and providing system warnings or system shutdowns in response to the signals. As will be discussed in more detail below, genset controller 100 is also capable of displaying (in real-time) information obtained from the signals, providing relay driver outputs (RDOs) in response to the signals, and relaying information in the signals to remote control and monitoring stations.

The 34 digital outputs 228 are driven by digital output drivers 256. The digital outputs 228 are controlled by the processor acting through FPGA 238. Three digital outputs are dedicated to a Controller Panel Lamp Relay, a Controller Engine Crank Relay, and a Controller Engine Fuel Relay. The remaining digital outputs are definable, and typically are RDOs that determine the on/off status of a variety of indication/warning lamps within a remote control station. The definitions of these digital outputs typically correspond to particular system warnings, shutdowns or other conditions. For example, the definable digital outputs can be RDOs corresponding to "NFPA-110" functions such as overspeed, overcranking, low oil pressure, or high coolant temperature of engine 152. The definable digital outputs can also be RDOs corresponding to loss of signal functions, including a loss of communications with ECM 160. Additionally, the definable digital outputs can be RDOs corresponding to one of many system fault conditions concerning the genset 150 or the genset controller 100 itself.

As shown in FIGS. 1 and 2, genset controller 100 also includes a number of operator interface devices, by which an operator can both provide commands to the genset controller and receive information from the genset controller. The operator interface devices are included on a front panel Man Machine Interface (MMI) 210, which is situated on a controller box. One of the operator interface devices is an emergency stop button 130. Emergency stop button 130 allows an operator to immediately stop the genset 150 by pressing a pushbutton.

A second operator interface device is a keypad/display 120, which includes 16 individual keypads 122 and a vacuum flourescent display (VFD) 124. Keypad/display 120 is coupled to a keypad/display interface 212 in front panel MMI 210, which in turn is coupled to internal databus 290. Keypads 122 allow an operator to enter a variety of information and commands to genset controller 100. VFD 124 is an alphanumeric display, and allows genset controller 100 to display various information concerning system operation and system faults to an operator. A VFD is employed because it provides good visibility over a large range of temperatures and from a wide range of viewing angles.

The operator interface devices further include a control switch 110, which can be rotatably set to one of three positions: an Automatic (Auto) position 112; an Off/Reset position 114; and a Run position 116. Setting the control switch to Run position 116 causes genset controller 100 to send a signal via ECM 160 to start and run the genset 150. Setting control switch 110 to Auto position 112 allows the genset 150 to be started and controlled from a remote location. This mode of operation also allows for time-delayed engine starting and cool-down. Setting control switch 110 to Off/Reset position 114 initiates the immediate shutdown of genset 150 and also results in a resetting of the software of genset controller 100. If a fault occurs that precipitates a system shutdown, an operator must move control switch 110 to Off/Reset position 114 to clear the fault before genset 150 can be started again.

Genset controller 100 also includes other devices which provide information to an operator, including several light-emitting diodes (LEDs) and an alarm horn (not shown). These devices are used to provide system status information to an operator, as well as to alert the operator to the existence of system faults. During the occurrence of some faults, a message concerning the fault or related warning/shutdown condition is displayed on VFD 124, an appropriate warning LED on front panel MMI 210 is turned on, the alarm horn is activated, and a corresponding RDO is produced at a digital output 228.

As shown in FIG. 1, genset controller 100 is capable of communication with other remote control and monitoring devices via both a K-BUS interface 109 and a second serial interface 108. K-BUS interface 109 provides serial communications using the proprietary K-BUS serial communications protocol. Second serial interface 108 provides serial communications using any of a variety of other "open" serial communications protocols, including the Modbus™ protocol. Each of K-BUS interface 109 and second serial interface 108 is configurable to use either the RS-232 or RS-485 standards.

In the preferred embodiment shown in FIG. 2, the structures associated with K-BUS interface 109 and second serial interface 108 include a first dual universal asynchronous receiver/transmitter (DUART) 270 that is coupled to two RS-485 conversion units 272 and 274, and a second DUART 280 that is coupled to an RS-485 conversion unit 282 and an RS-232 conversion unit 284. Each of DUARTs 270, 280 is coupled to internal databus 290 and is controlled in response to program instructions executed by microcomputer 240.

The microprocessor 240 operates the genset under the direction of programs illustrated in FIGS. 3 and 4. The programs include scheduled tasks which, as illustrated in FIG. 3, are performed one at a time under the direction of a task scheduler program 302. The programs also include asynchronous tasks as illustrated in FIG. 4. The asynchronous tasks are performed in response to interrupts that are managed by a real time, asynchronous program 402.

Referring to FIGS. 3 and 4, two block diagrams 300, 400 are provided showing software based subsystems (or tasks) that are performed by microprocessor 240 of genset controller 100. Through the operation of these subsystems, microprocessor 240 is capable of monitoring genset 150 (as well as capable of monitoring the operation of genset controller 100), receiving operator commands, detecting system faults, providing system warnings and shutdowns when necessary, displaying information at keypad/interface 120 (and at other operator interface devices), and conducting communications with genset 150, ECM 160 and other devices via K-BUS interface 109 and second serial interface 108. The subsystems of block diagrams 300, 400 are self-contained routines that control specific aspects of genset controller 100. Each subsystem is an independent, modular unit with well-defined input/output protocols to communicate with other subsystems.

Block diagram 300 shows scheduled tasks or subsystems, which are scheduled according to a task scheduler subsystem 302. The task scheduler subsystem 302 is capable of invoking any scheduled subsystem at a rate of up to 100 times a second, and is able to handle transitions between scheduled subsystems and to monitor the execution times of scheduled subsystems to make sure that the subsystems do not exceed their time allotments. As shown, other scheduled subsystems (which are scheduled by task scheduler subsystem 302) include a user interface subsystem 304, a state machine subsystem 306, a metering subsystem 308, a voltage regulator subsystem 310, a display subsystem 312, a digital inputs subsystem 314, and a fault detection/handling subsystem 316. Further, the scheduled subsystems include a load disturbance detection subsystem 318, a Modbus™ (or other serial communications) subsystem 320, a K-BUS subsystem 322, a thermal protection subsystem 324, an analog inputs subsystem 326, and an EEPROM data storage subsystem 328.

Block diagram 400 shows asynchronous tasks or subsystems. As shown in block 402, these subsystems operate in real time, asynchronously, with respect to the scheduled subsystems (i.e., operate in the "background" of the scheduled subsystems). The asynchronous subsystems also provide data when the scheduled subsystems require such data. The asynchronous subsystems are interrupt-driven modules and can take advantage of special features of microprocessor 240 (such as the embedded time processing unit within the microprocessor). The asynchronous subsystems include a serial communications subsystem 404, a timer subsystem 406, a real time math subsystem 408 (which employs a time processing unit of microprocessor 240), and a SAE J1939 interface subsystem 409.

Figure 5:
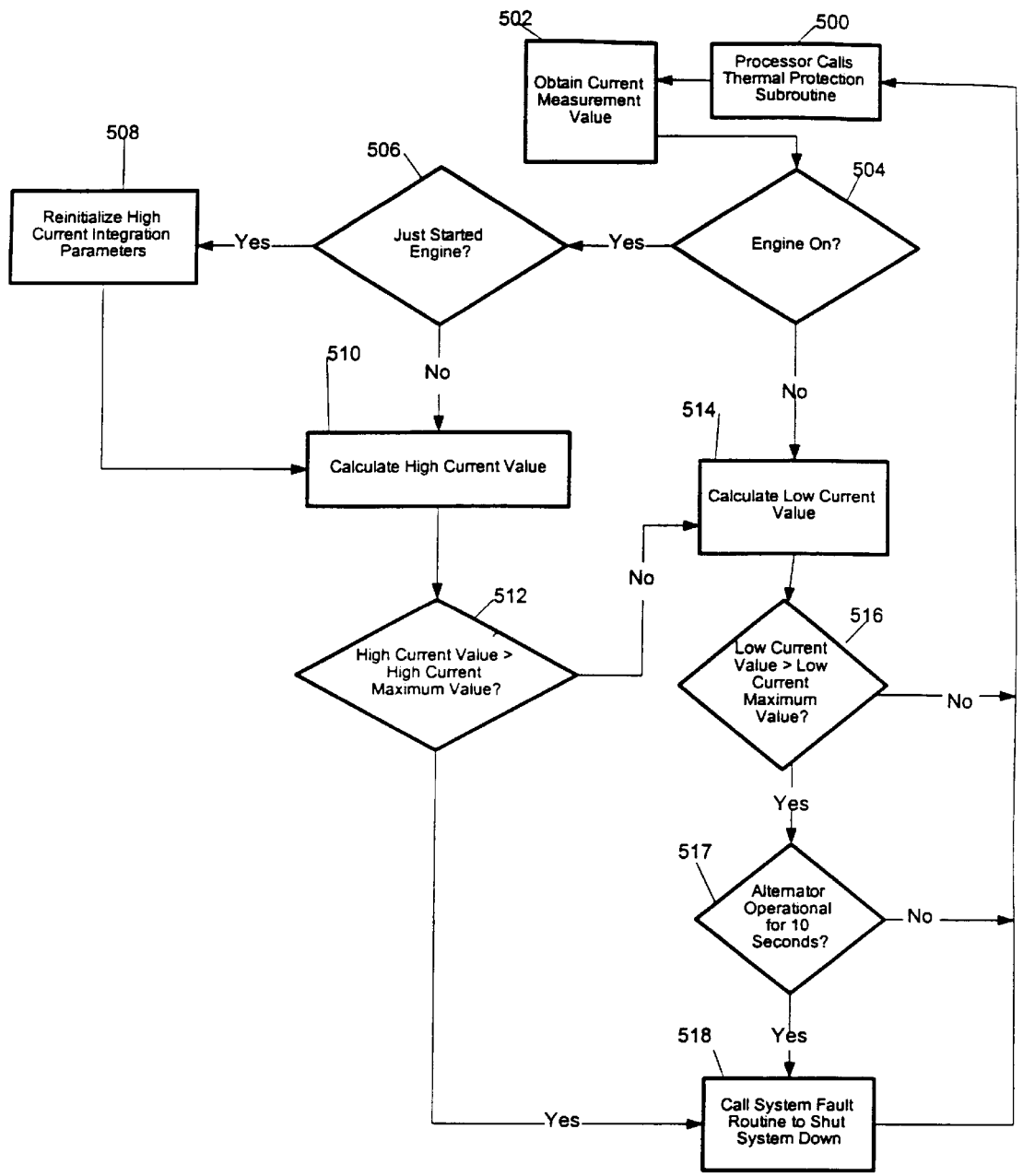
FIG. 5 is a flow chart with exemplary method steps that are performable by the apparatus of FIG. 1 in accordance with one embodiment of the invention.

Turning to FIG. 5, a flowchart is provided showing exemplary method steps that are performed by the genset controller 100 in accordance with one embodiment of the invention. The performance of the method begins at step 500, in which the processor 101 of genset controller 100 calls a thermal protection subroutine. The thermal protection subroutine is executed as part of the thermal protection subsystem 324. Upon the calling of the thermal protection subroutine, the genset controller 100 obtains a current measurement value concerning one or more currents of the alternator 154 of genset 150. As discussed, current information is provided via current transformer 158 to the three-phase input interface 104. The current measurement value typically is in a root mean squared format. Typically, each current measurement value is based upon actual measured current values associated with all of the three windings of the alternator 154; however, the current measurement value can also be based upon information concerning fewer or only one of the windings. The obtaining of current measurement values can occur independently of the execution of the thermal protection subroutine. However, current measurement values must be obtained for the thermal protection subroutine to proceed, and thus the flow chart of FIG. 5 includes step 502. In the preferred embodiment of the invention, new current measurement values are obtained every one second, and the thermal protection subroutine is repeated every one second.

Following step 502, the thermal protection subroutine proceeds to step 504, at which it is determined whether the engine 152 of the genset 150 is currently on. If the engine is not on, the subroutine proceeds to step 514, at which a low current value is calculated, as further discussed below. If the engine is on, the subroutine proceeds from step 504 to step 506, at which the processor 101 determines whether the engine just started operating. The determinations of whether the engine 152 is on or has just started operating can be made by way of signals from ECM 160 that are provided to CAN interface 103.

If the engine 152 just started operating, the subroutine proceeds from step 506 to step 508, at which the processor 101 reinitializes the high current integration parameters. Otherwise, the subroutine proceeds directly to step 510, at which the processor 101 calculates a high current value, as further discussed below. During the reinitialization at step 508, the processor 101 eliminates various recorded data from the memory. In particular, data corresponding to the high current value calculations, including recent current measurement values utilized in those calculations, is eliminated from memory. The currently-stored high current value is also set to zero. Upon completion of step 508, the subroutine proceeds to step 510.

At step 510, a high current value is calculated by the processor 101. The high current value that is calculated is indicative of the strength of the measured currents within the alternator 154 during a most recent time period. In the preferred embodiment, the recent time period of interest is ten seconds. The high current value is calculated as the sum of the squares of ten normalized currents corresponding to the current measurement values taken during the ten most recent seconds of operation of the engine 152. Each normalized current is a per unit value calculated by dividing the respective current measurement value by a rated standby or maximum current value (RMS). The maximum current value is determined as discussed with respect to FIG. 6. Typically, to calculate the high current value, a rotating buffer of the last ten current measurement values is maintained.

Once the high current value is calculated in step 510, the subroutine proceeds to step 512, at which the high current value is compared with a high current maximum value $H_{MAX}$. The comparison determines whether the following inequality is true:

$$\sum_{1}^{10} I^2 > H_{max} \quad (1)$$

where the left hand side of the inequality is the definition of the high current value as discussed with respect to step 510. In the preferred embodiment, the high current maximum value $H_{MAX}$ is 90. The value of 90 is chosen based upon the NEMA MG 1-16.45 standards. Thus, if the normalized current value (I) is continuously greater than 3 for any 10-second window of operation of the engine 152, the inequality of equation (1) is true and therefore it is determined that the current within the alternator 154 is excessive. If the current is determined to be excessive at step 512, the subroutine proceeds to step 518, in which the processor 101 provides a command to shut down the operation of genset 150.

The command provided at step 518 normally involves calling a system fault routine to shut the genset 150 down. In other embodiments, only a portion of the genset 150 is commanded to be shut down, such as the engine 152 or the alternator 154. In further embodiments, the processor 101 does not provide a command to completely shut down the genset 150 or a portion thereof, but rather provides a command to reduce some operational parameter of the genset or a portion thereof, e.g., a command to slow down the speed of engine 152. The system fault routine of step 518 in one embodiment is performed by way of fault detection/handling subsystem 316. The command provided by processor 101 typically results in a signal being transmitted from CAN interface 103 to ECM 160, which then effects the appropriate response from the genset 150. In certain embodiments, the commands of the processor 101 are effected by way of voltage regulator interface 105 or another interface. In additional embodiments, elements of the genset controller 100 or other elements are also shut down, or other events are triggered, upon the determination of excessive current at step 512.

If the inequality of equation (1) is found to be untrue at step 512, the subroutine proceeds to step 514, at which a low current value is calculated. The low current value is an indicator of the overall current experienced by the alternator 154 throughout its operation. Specifically, the low current value is a summation of the squares of normalized currents corresponding to each of the current measurement values taken with respect to the alternator 154 over its entire period of operation, or at least the entire period since the thermal protection subroutine began operating. The normalized currents used to determine the low current value are calculated in a different manner than the normalized currents used to calculate the high current value. In this case, each normalized current is calculated by dividing a respective current measurement value by the maximum current value (RMS) to obtain a per unit value and then subtracting 1 from the result.

Further unlike the summation performed to obtain the high current value at step 510, the summation performed at step 514 adds the squared normalized currents when the normalized currents are positive, but subtracts the squared normalized currents when the normalized currents are negative. For example, if the result of taking a current measurement value and dividing it by the maximum current is less than 1, the resulting normalized current is negative, and so the squared normalized current is subtracted from the overall summation. Consequently, the low current value not only increases when the current measurement values are high, but also decreases when the current measurement values are low.

Upon calculating the low current value in step 514, the processor 101 determines whether the low current value exceeds a low current maximum value $L_{MAX}$ in accordance with equation (2):

$$\Sigma(I-1)^2 > L_{MAX} \quad (2)$$

In the preferred embodiment, the low current maximum value $L_{MAX}$ is 40. The value of 40 is chosen based upon the NEMA MG 1-1998-32.7, MG 1-1998-32.8, and MG 1-1998-32.13 standards. If the low current maximum value is not exceeded, the processor 101 repeats the subroutine by returning to step 500. If the low current maximum value is exceeded, the processor 101 proceeds to step 517, at which it is determined whether the alternator 154 (or, in alternate embodiments, the engine 152 or the thermal protection subroutine) has been operational for 10 seconds.

If the alternator 154 has not been operational for seconds, the fact that the low current value is determined to exceed the low current maximum value is not indicative of an excessive alternator current. The low current maximum value is chosen as a maximum level that can be sustained nearly indefinitely, and consequently is a much lower level than that which can be sustained for less than 10 seconds.

Consequently, if less than 10 seconds have passed, the processor 101 returns to step 500 to repeat the subroutine. If the thermal protection subroutine has been operational for 10 seconds, and the low current value has been determined to exceed the low current maximum value, then the alternator current is excessive. In such case, the processor 101 proceeds to step 518 and provides a command to shut down or otherwise limit the operation of the genset 150 or a portion thereof. Although in FIG. 5, the thermal protection subroutine is shown to be repeated upon completion of step 518, this need not be the case.

In the case where the thermal protection subroutine has already been operating for more than ten seconds but the engine 152 is off, e.g., the genset 150 was operating but has been turned off temporarily, the thermal protection subroutine can keep operating. In such case, the calculated high current value is not updated while the engine 152 is off, since the thermal protection subroutine skips steps 506–512. The calculated low current value decreases while the engine 152 is off, since during this time a negative value (representative of zero actual current) is added to the summation for calculating the low current value during each cycle of the subroutine.

Alternate embodiments of the thermal protection subroutine shown in FIG. 5 are also possible. In one alternate embodiment, the order of the steps performed by the subroutine is changed such that an evaluation of the low current value is made prior to an evaluation of the high current value. In one such embodiment, the reversal in the order of steps relating to the evaluations of the low current and high current values only occurs while the alternator has not yet been operational for ten seconds. In a second alternate embodiment, upon commencement of the operation of the thermal protection subroutine, the sampling of the current measurement values used to calculate the low current value is delayed by one sample, e.g., one cycle through the thermal protection subroutine, relative to the sampling of the current measurement values used to calculate the high current value. That is, the calculated low current value (which is not allowed to fall below zero) is maintained at zero following the first cycle through the subroutine even though the calculated high current value may have been calculated to be greater than zero. Such delaying of the sampling of the current measurement values used to calculate the low current value assures that a false determination of excessive current is not made as a result of a particularly high transient current during the startup of the genset 150.

Figure 6:
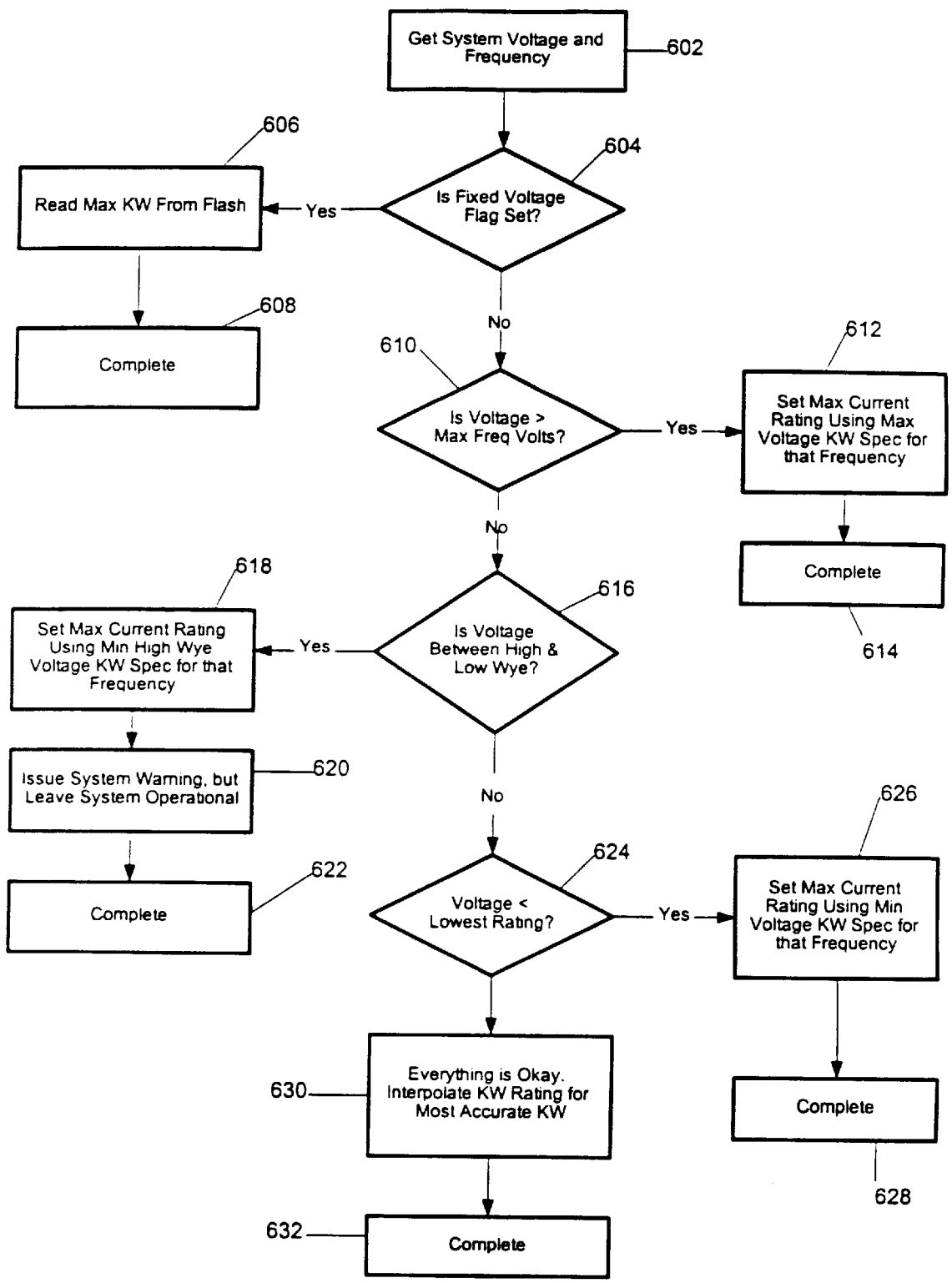
FIG. 6 is a flow chart with exemplary method steps for determining a maximum power value used in the performance of the method steps of FIG. 5.

As discussed, to calculate the high current value and the low current value, the current measurement values must be normalized with respect to a rated standby or maximum current value. Under normal operating circumstances, in one embodiment, the maximum current value $I_{MAX}$ is calculated as follows:

$$I_{MAX} = \frac{KW \times 1000}{System\ Voltage \times .8 \times \sqrt{3}} \quad (3)$$

where KW is a maximum power value for the alternator 154. Thus, the maximum current value depends upon a maximum power value and the system or output voltage. The maximum power value can be determined in accordance with a second subroutine as showed in the flow chart of FIG. 6 and a corresponding voltage/frequency table as shown in FIG. 7. Referring to FIG. 6, to determine the maximum power value, the genset controller 100 begins the execution of the second subroutine by determining the system voltage and frequency at step 602. At step 604, the genset controller 100 determines whether a fixed voltage flag has been set. This can occur if the genset 150 includes a specialty or high voltage alternator. If the genset controller 100 determines that a fixed voltage flag has been set, it proceeds to step 606, at which a maximum power value is read directly from the flash memory 232, and then proceeds to step 608, at which the second subroutine is completed. In alternate embodiments, a maximum current value is directly read from the flash memory such that, in this case, equation (3) need not be employed to calculate the maximum current value.

If the fixed voltage flag is not set, which is normally the case, the genset controller 100 proceeds to step 610. Because the fixed voltage flag is not set, the genset controller 100 determines the maximum power value by way of the voltage/frequency table shown in FIG. 7. The table of FIG. 7 displays various maximum power values corresponding to different system voltages and frequencies. In step 610, the genset controller 100 determines whether the system voltage is greater than the maximum voltage allowed on the table of FIG. 7 for the particular frequency of operation. If the system voltage is determined to be greater than the maximum voltage in step 610, the genset controller 100 selects the maximum power value shown on the voltage/frequency table for the appropriate frequency and then the second subroutine is completed at step 614. For example, since the table only provides maximum power values for system voltages up to 440 volts (high wye) for a 50 Hz frequency of operation, the genset controller 100 will select the maximum power value corresponding to the 440 volt level (e.g., 160 kW) if the system voltage is above 440 volts and the system is operating at 50 Hz.

If the system voltage is not greater than the maximum voltage allowed on the voltage/frequency table of FIG. 7, the genset controller 100 proceeds to step 616, at which the genset controller determines whether the system voltage is between the high wye and low wye voltages. If the genset controller 100 determines that the voltage is between the high wye and low wye voltages, the genset controller selects the maximum power value corresponding to the minimum high wye voltage for the particular frequency of operation from the table of FIG. 7. The genset controller then proceeds to step 620, at which a system warning is issued without affecting system operability, and then the second subroutine is completed at step 622. If the system voltage is not determined to be between the high wye and low wye voltages, the genset controller 100 proceeds to step 624, at which the genset controller compares the system voltage to the lowest voltage rating (or minimum voltage) on the voltage/frequency table. If the system voltage is determined to be less than the lowest rating, the genset controller 100 proceeds to step 626, at which the genset controller selects the maximum power value corresponding to the minimum voltage allowed on the voltage/frequency table for the particular frequency of operation. The second subroutine is then completed at step 628.

If the system voltage is determined to be greater than the lowest voltage rating allowed on the voltage/frequency table, then the genset controller 100 proceeds to step 630, in which the genset controller interpolates the appropriate maximum power value based upon the information in the voltage/frequency table. For example, if the system frequency is 60 Hz and the system voltage is 225 volts (low wye), then the appropriate maximum power value determined using linear interpolation is 285 kW. In alternate embodiments, various forms of non-linear interpolation are employed. Upon calculation of the maximum power value, the second subroutine is completed at step 632. However, in certain alternate embodiments, the maximum current value determined by way of equation (3) is compared with a predetermined level, and a command is issued to the fault subsystem if the current is calculated to be too high.

The maximum power values of the voltage/frequency table of FIG. 7 are stored within a section of the flash memory 232 of the genset controller 100 along with other default system parameters. Because of their nature, the values are alternator specific, and are downloaded into the flash memory 232 at the time the genset controller 100 is placed onto the genset 150. The information is meant to be unalterable by the end user of the device.

While the foregoing specification illustrates and describes the preferred embodiments of this invention, it is to be understood that the invention is not limited to the precise construction herein disclosed. The invention can be embodied in other specific forms without departing from the spirit or essential attributes of the invention.

For example, the maximum current value $I_{MAX}$ can be determined in a manner other than through the use of equation (3) and the voltage/frequency table of FIG. 7, e.g., through the use of a formula. Also, for example, the exact low current and high current maximum values used in equations (1) and (2) can vary greatly depending upon the application, as can the exact manner in which the current measurement values are normalized for use in those equations. Additionally, in other embodiments, the calculations of the low current and high current values can vary. For example, in different embodiments the calculations of these values will vary in terms of the number of normalized currents that are summed together, to account for current variation within the alternator 154 during other time periods then those specified herein. Accordingly, reference should be made to the following claims, rather than to the foregoing specification, as indicating the scope of the invention.

What is claimed is:

1. A method of preventing damage to an alternator of a genset resulting from high currents within the alternator, the method comprising:

calculating, at a processor, a first quantity related to a current flowing through the alternator during a first time period;

comparing, at the processor, the first quantity with a first threshold;

calculating, at the processor, a second quantity related to the current flowing through the alternator during a second time period, wherein one of the first and second time periods is of greater length than the other of the first and second time periods;

comparing, at the processor, the second quantity with a second threshold; and indicating a current overload condition if at least one of the first quantity exceeds the first threshold or the second quantity exceeds the second threshold.

2. A method of preventing damage to an alternator of a genset resulting from high currents within the alternator, the method comprising:

calculating, at a processor, a first quantity related to a current flowing through the alternator during a first time period;

comparing, at the processor, the first quantity with a first threshold;

calculating, at the processor, a second quantity related to the current flowing through the alternator during at least one of the first time period and a second time period;

comparing, at the processor, the second quantity with a second threshold; and indicating a current overload condition if at least one of the first quantity exceeds the first threshold or the second quantity exceeds the second threshold, wherein the calculating includes (a) obtaining a first measured current value indicative of the current during a first short time period;

(b) taking the square of a first related value that is functionally dependent upon the first measured current value to obtain a first comparison value;

(c) repeating (a) and (b) to obtain at least one additional measured current value indicative of the current during at least one additional short time period, and to take the square of at least one additional related value that is functionally dependent upon the at least one additional measured current value to obtain at least one additional comparison value; and (d) adding the first comparison value and the at least one additional comparison value to obtain at least one of the first quantity and the second quantity.

3. The method of claim 2, wherein the first time period and the second time period each include at least one time period equivalent in length to the first short time period.

4. The method of claim 2, wherein the first related value is a first normalized current value, and wherein the first normalized current value is calculated based upon the first measured current value by dividing the first measured current value by a maximum current value.

5. The method of claim 4, wherein the maximum current value is calculated based upon the following equation:

$$I_{MAX} = \frac{KW \times 1000}{System\ Voltage \times .8 \times \sqrt{3}};$$

and wherein the KW value is obtained by way of a maximum power subroutine and a voltage/frequency lookup table.

6. The method of claim 2, wherein the first related value is a first normalized current value, and wherein the first normalized current value is calculated based upon the first measured current value by dividing the first measured current value by a maximum current value and then subtracting unity.

7. The method of claim 2, wherein the at least one additional measured current value includes nine measured current values, each of the nine measured current values being obtained based upon nine respective measurements taken during nine respective short time periods;

wherein the at least one additional comparison value includes nine comparison values, each of the nine comparison values being obtained by taking the squares of nine respective related values that are functionally dependent upon the nine respective measured current values; and wherein the first quantity is obtained by adding the first comparison value and each of the nine comparison values.

8. The method of claim 7,
wherein the first short time period and each of the nine short time periods are successive single-second time periods, which together form a ten second window; and
wherein the first threshold is equal to 90.

9. The method of claim 2,
wherein (a) and (b) are continually repeated for additional short time periods while the genset is operational, so that a respective additional measured current value is obtained during each respective additional short time period, a respective additional related value is obtained that is functionally dependent upon each respective additional measured current value, and a respective comparison value is obtained by taking the square of each respective additional related value.

10. The method of claim 9,
wherein the first quantity is obtained by adding the first comparison value and each of the additional comparison values.

11. The method of claim 9,
wherein the second quantity is obtained by:
(i) adding the first comparison value when the first related value is a positive number;
(ii) subtracting the first comparison value when the first related value is a negative number;
(iii) adding each respective additional comparison value when the respective related value is a positive number; and
(iv) subtracting each respective additional comparison value when the respective related value is a negative number.

12. The method of claim 11, wherein the first short time period and each of the additional short time periods are successive single-second time periods; and
wherein the second threshold is equal to 40.

13. The method of claim 11, wherein the first quantity includes the first comparison value based upon the first measured current value, but the second quantity does not include the first comparison value, and does not include any comparison value based upon the first measured current value.

14. A method of preventing damage to an alternator of a genset resulting from high currents within the alternator, the method comprising:
(a) calculating a first quantity equaling a first sum of n squares of n type-A normalized currents determined based upon n most recent current measurements obtained during n most recent successive short time periods;
(b) determining whether the first quantity exceeds a first threshold;
(c) providing a first command to limit an operation of the genset when it is determined that the first quantity exceeds the first threshold;
(d) calculating a second quantity equaling a second sum of x values functionally dependent upon x squares of x type-B normalized currents determined based upon x current measurements obtained during x successive short time periods, wherein x is the total number of short time periods that have occurred since at least one of a first time at which a performance of the method began and a second time occurring after the first time;
(e) determining whether the second quantity exceeds a second threshold; and
(f) providing a second command to limit an operation of the genset when it is determined that the second quantity exceeds the second threshold.

15. The method of claim 14, further comprising:
(g) obtaining a new current measurement with respect to a new short time period; and
(h) repeating (a)–(g).

16. The method of claim 14, wherein n is equal to 10, and each short time period lasts one second.

17. The method of claim 14, wherein (a)–(c) are performed only when an engine of the genset is operating, and (f) is performed only when x exceeds 9.

18. An apparatus for preventing damage to an alternator of a genset resulting from high currents within the alternator, the apparatus comprising:
a means for measuring a current flowing within the alternator during successive time periods;
a processor coupled to the means for measuring, wherein the processor is operable to:
calculate a first parameter that is related to a first set of measured current values that were obtained at respective different times by the means for measuring during a first time period,
calculate a second parameter that is related to a second set of measured current values that were obtained at respective different times by the means for measuring during a second time period,
compare the first parameter with a first threshold and the second parameter with a second threshold, and
provide a command to cause at least a portion of the genset to be limited in its operation when either the first parameter exceeds the first threshold or the second parameter exceeds the second threshold; and
a means responsive to the command to alter the operation of the genset.

19. An apparatus for preventing damage to an alternator of a genset resulting from high currents within the alternator, the apparatus comprising:
a means for determining whether a current flowing through the alternator during a recent time period has been excessive;
a means for determining whether a current flowing through the alternator during an extended time period different in length than the recent time period has been excessive; and
a means for halting the operation of the genset if at least one of the two determining means determines that the current has been excessive.

* * * * *

UNITED STATES PATENT AND TRADEMARK OFFICE
CERTIFICATE OF CORRECTION

PATENT NO. : 6,701,221 B1  Page 1 of 1
DATED : March 2, 2004
INVENTOR(S) : Zane C. Eaton et al.

It is certified that error appears in the above-identified patent and that said Letters Patent is hereby corrected as shown below:

<u>Column 10,</u>
Line 61, "for seconds" should be -- for 10 seconds --.

Signed and Sealed this

Twenty-sixth Day of October, 2004

JON W. DUDAS
*Director of the United States Patent and Trademark Office*